(12) United States Patent
Kimbuende et al.

(10) Patent No.: US 8,694,891 B2
(45) Date of Patent: Apr. 8, 2014

(54) LOG COLLECTOR IN A DISTRIBUTED COMPUTING SYSTEM

(75) Inventors: Gerard N. Kimbuende, Atlanta, GA (US); Rex R. Newton, Tucson, AZ (US); Joseph A. Scott, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/180,138

(22) Filed: Jul. 11, 2011

(65) Prior Publication Data

US 2013/0019180 A1  Jan. 17, 2013

(51) Int. Cl.
*G06F 15/177* (2006.01)
*G06F 3/00* (2006.01)

(52) U.S. Cl.
USPC .......................................... 715/736; 715/741

(58) Field of Classification Search
USPC .................................. 715/736, 741
See application file for complete search history.

(56) References Cited

U.S. PATENT DOCUMENTS

| 7,224,686 | B1 * | 5/2007 | Doskow et al. ............... 370/352 |
| 7,523,086 | B1 * | 4/2009 | Teague et al. .................... 1/1 |
| 2004/0220945 | A1 | 11/2004 | Pioli et al. |
| 2007/0143842 | A1 | 6/2007 | Turner et al. |
| 2008/0120129 | A1 * | 5/2008 | Seubert et al. .................... 705/1 |
| 2013/0237254 | A1 * | 9/2013 | Papakipos et al. ......... 455/456.3 |
| 2013/0260795 | A1 * | 10/2013 | Papakipos et al. ......... 455/456.3 |

OTHER PUBLICATIONS

Wikipedia, "Telnet", [online], last modified on Jun. 6, 2011, retrieved from the Internet at <URL:http//en.wikipedia.org./wiki/telnet>, 5 pp.
Wikipedia, "Secure Shell", [online], last modified on Jun. 6, 2011, retrieved from the Internet at <URL: http://en.wikipedia.org/wiki/secure_shell>, 8 pp.
A. Osuna, et al., "TS7680 Deduplication ProtecTIER Gateway for System z", IBM Corporation, Redbooks, Document No. SG24-7796-00, Aug. 2010, pp. 1-340.

* cited by examiner

*Primary Examiner* — David Phantana Angkool
(74) *Attorney, Agent, or Firm* — Konrad Raynes Davda & Victor LLP; William K. Konrad

(57) ABSTRACT

In one aspect of the present description, in response to receiving a request from a system administrator or other user of a distributed computing system for a log report generated by the system, the system can remotely access various nodes of the system and obtain the log reports at those nodes in response to that user request. In the illustrated embodiment, such remote access and log retrieval may be undertaken whether or not the system administrator is logged into any of the reporting nodes or has direct access to the reporting nodes. As a result, obtaining pertinent log reports from various nodes of the distributed computing system may be facilitated. Other features and aspects may be realized, depending upon the particular application.

20 Claims, 3 Drawing Sheets

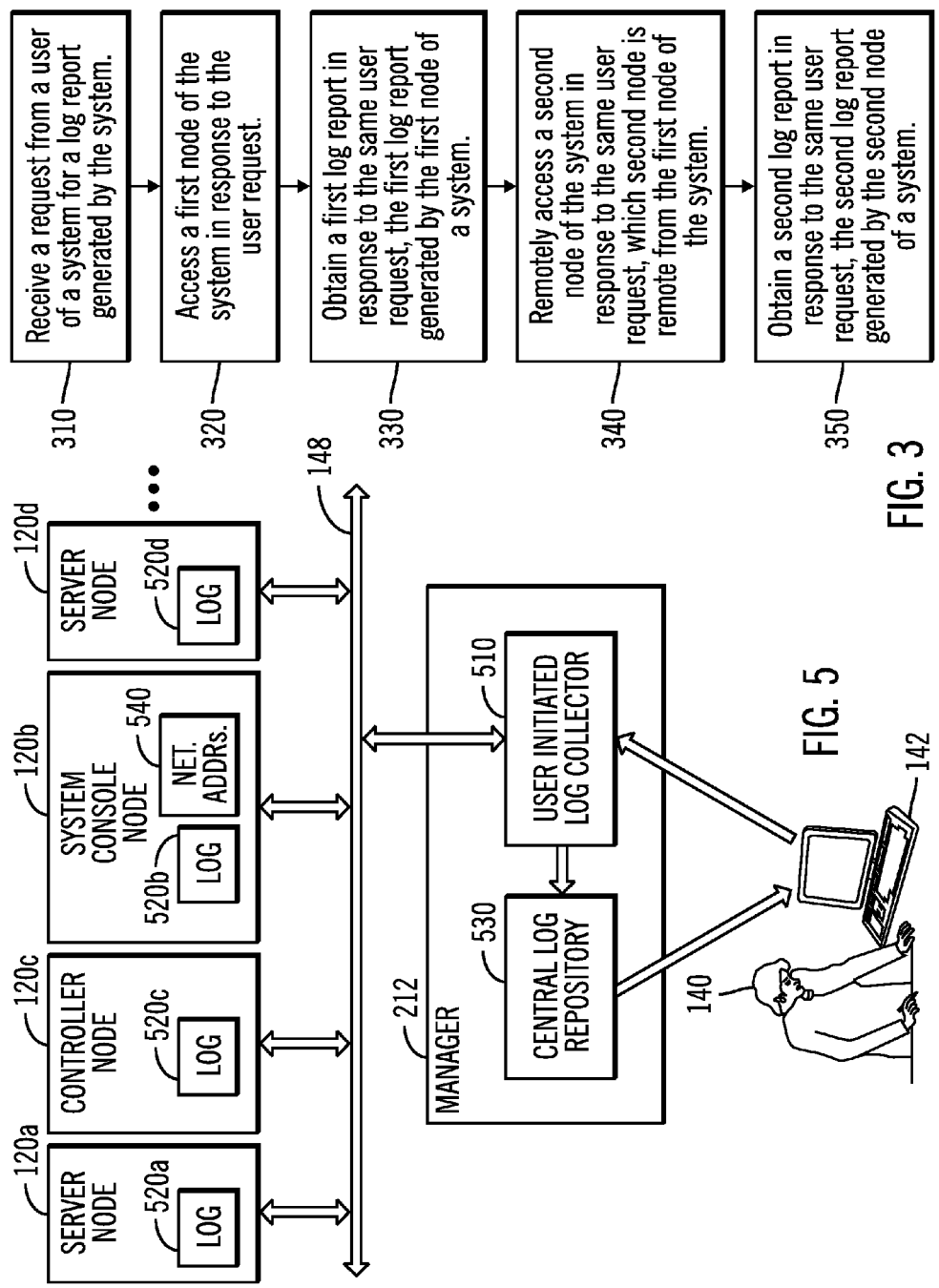

LOG COLLECTOR IN A DISTRIBUTED COMPUTING SYSTEM

TECHNICAL FIELD

This invention relates in general to distributed computing systems, and more particularly, to a method, system and program product for gathering log reports in a distributed computing system.

BACKGROUND

In order to provide a high-throughput of work, or to ensure nearly continuous availability, distributed computing systems are often utilized. A distributed computing system includes two or computers or other processors which frequently operate somewhat autonomously and communicate with each other over a network or other communication path.

A component of a distributed system that has the capability of sharing resources is often referred to as a cluster which has two or more nodes, each node having a processor or at least a processor resource, and typically, a separate operating system. One example of a distributed computing system utilizing one or more clusters is the IBM System Storage TS7680 ProtectTier Deduplication Gateway, which is a virtual tape library which appears to applications as one automated tape library. The distributed computing system of the TS7680 also usually includes several controllers which communicate with the clusters over a network.

In a large cluster environment, it is often desirable for a system administrator to be able to view significant events of various nodes of the system from a central location, often referred to as a central management node. This often can be difficult to do, however. Normally, significant events are represented by a log entry in a particular log file on a node in the distributed system where the event occurred. Should all log entries in all log files on all the nodes in a distributed system be sent to the central management node, this could result in too much network traffic and too much data on the central management node. Conversely, if individual log files are maintained only on the nodes, however, the administrator may need to access many nodes to view all the pertinent logs when trying to resolve a problem.

Moreover, in some distributed computing systems, not all nodes may be accessible to any one administrator. For example, some nodes may be accessible only by authorized service personnel provided by the vendor of the components of that node. Many distributed computing systems utilize proprietary hardware and software which may differ from one component to the next. Thus, one system administrator may be called in to collect logs from one type of components such as controllers, for example, whereas a different system administrator may be called in to collect logs from a different type of component such as clusters, for example.

Still further, the manner of obtaining log reports may differ depending upon the type of node on which the log report resides, thereby making the administrator's task of gathering the log reports from various nodes more difficult. For example, the nodes of a distributed computing system often utilize different operating systems such as AIX, UNIX and Linux which may employ different types of log reporting. However, a system administrator may be more skilled in one type of operating system but perhaps less so with respect to another. Hence, a system administrator may be more adept at obtaining log reports from components having a particular operating system as compared to another type of operating system.

Also, the information contained in a log report may differ as a function of the system used to obtain the report. For example, log reports available to a system administrator may differ from log reports available to service personnel such that none of the reports may be complete.

There may be additional limitations on the ability of a system administrator to obtain a log report. For example, a local system administrator located away from a remotely located component of the distributed computing system may encounter difficulties in obtaining a log report generated by a remotely located component.

A log subsystem on operating systems such as UNIX and Linux, called syslog, has a forwarding mechanism that allows log entries of certain categories to be sent to a central location. However, if all log entries are not forwarded, some event entries of interest may be missed. Conversely, if all log entries are forwarded, entries of interest may be difficult to locate amongst all the other log data.

SUMMARY

In one aspect of the present description, operations are described for user-initiated log collecting in a distributed computing system. In one embodiment, operations include receiving a request from a user of a system for a log report generated by the system, accessing a first node of the system in response to the user request, obtaining a first log report in response to the same user request, the first log report being generated by the first node of a system, remotely accessing a second node of the system in response to the same user request, which second node is remote from the first node of the system, and obtaining a second log report in response to the same user request, the second log report generated by the second node of a system.

In another aspect, the receiving the user input includes inputting a selection by the user, of an icon of a graphical user interface of the system, wherein the icon represents a log gathering function of the system.

In yet another aspect, the remotely accessing the second node includes communicating over a network linking the first and second nodes, using a virtual terminal connection in accordance with a network protocol which permits bidirectional interactive communication including file transfer.

In still another aspect, remotely accessing the second node includes accessing a system console or other location linked to the first and second nodes by the network and obtaining the network address of the second node from the system console.

In another aspect, accessing the system console includes obtaining the network address of the system console from the first node and remotely accessing the system console including communicating over the network linking the first node and the system console using a virtual terminal connection in accordance with a network protocol which permits bidirectional interactive communication using a virtual terminal connection.

In yet another aspect, first and second log reports of the first and second nodes, respectively, are stored in a directory of the system console or other location.

In still another aspect, the first and second log reports of the first and second nodes, respectively, are stored in a common location, and a confirmation is provided to the user that the log reports for the first and second nodes have been obtained and stored.

In yet another aspect, the first and second log reports of the first and second nodes, respectively, are compressed and stored in a common location, and using a graphical user interface, a confirmation is provided to the user that the log reports for the first and second nodes have been obtained and stored.

Other features and aspects may be realized, depending upon the particular application.

BRIEF DESCRIPTION OF THE DRAWINGS

FIG. 3 depicts an example of operations for a user-initiated log collector in accordance with one embodiment of the present description.

FIG. 5 depicts an example of operations for a user-initiated log collector in accordance with one embodiment of the present description.

DETAILED DESCRIPTION

Figure 1:
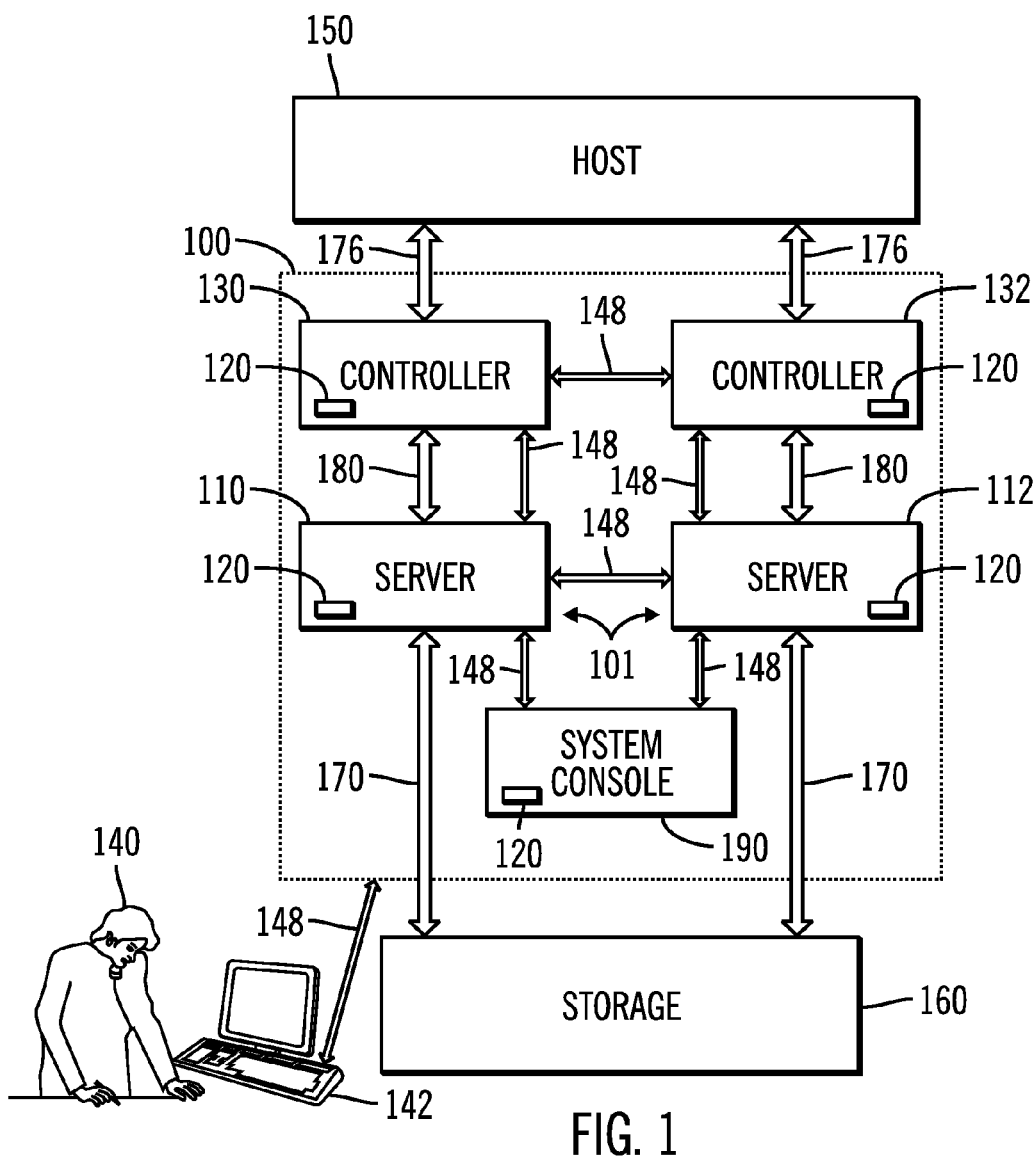
FIG. 1 illustrates an embodiment of a computing environment in which an aspect of the present description may be employed.

One example of a distributed computing system incorporating and using aspects of the present description in accordance with one embodiment, is depicted at 100 in FIG. 1 and described herein. A distributed computing system in accordance with the present description may include a plurality of computing nodes, which may be provided by various computing devices including clusters, controllers and other programmed or dedicated processors.

In the example of FIG. 1, the distributed computing system 100 includes a cluster 101 having two servers, a server 110 and a server 112, each of which may include one or more nodes 120 which share resources and collaborate with each other in performing system tasks. Although one cluster 101 and two servers 110, 112 are depicted in the illustrated embodiment, it is appreciated that the distributed computing system 100 may have a fewer or a greater number of clusters and servers, depending upon the particular application.

Each server 110, 112 may have one or more central processing units (CPUs) in which the processing, memory and other resources of the server may be apportioned into logical partitions, often referred to as a "virtual server," each of which is capable of running an individual copy of an operating system and performing the functions of a "server". Thus, as used herein, the term "server" may be used to refer to a physical server or a logical partition or virtual server performing a server function.

Each node 120 typically includes a virtual or physical server having processor and memory resources running an individual copy of an operating system. Hence, each node 120 is capable of independently generating individual log reports to record the occurrence of various events.

A server may have multiple I/O adapters including host and device adapters which are accessed through a switch such as a PCIe switch, for example. To increase efficiency, it is often desirable to share I/O adapters amongst the servers of the cluster. Thus, a device adapter, for example, may be shared as a "virtual" device adapter. The servers typically communicate with the device adapters and other I/O adapters over a "fabric" which may comprise one or more interfaces providing communication paths between the servers and adapters.

In the illustrated embodiment, the server 110 is depicted as having a single node 120 and the server 112 is depicted as having a single node 120, for example. It is appreciated that the number of nodes 120 in each server 110, 112 may vary, depending upon the particular application.

In the example of FIG. 1, the distributed computing system 100 further includes two controllers 130, 132, each of which may include one or more nodes 120. Each controller 130, 132, like the servers 110, 112 may have one or more central processing units (CPUs) in which the processing, memory and other resources of the cluster may be apportioned into logical partitions, which again, may be referred to as a "virtual server," each of which is capable of running an operating system and performing the functions of a "server". Each node 120 of the controllers 130, 132, like the servers 110, 112, typically includes a virtual or physical server running an individual copy of an operating system. Hence, each node 120 of the controllers 130, 132, is capable of independently generating individual log reports to record the occurrence of various events.

A system administrator 140 or other human operator of the system 100 may access a node 120 of the servers 110, 112 using a manager program or other software running on a workstation 142, which may be remotely located or may be at the same locale as one or more components of the distributed computing system 100. Communication paths 148 interconnect the various nodes 120 of the distributed computing system 100 and also the workstation 142. The communication paths 148 may be part of an Ethernet network, for example, such that each node 120 has an individual IP (internet protocol) address. Other types of networks or other communication paths may be utilized, depending upon the particular application.

In the illustrated embodiment, the system administrator may be logged into a first node 120 of a server 110, 112, for example, to monitor that particular node. Should some event occur while the system administrator is logged into that particular node, the system administrator may decide to obtain problem reports or other log reports to facilitate further analyzing the circumstances of that event. Alternatively, should the system administrator not be logged into any particular node when the event is detected, the system administrator can log into a first node and request problem reports or other log reports to facilitate further analyzing the circumstances of that event.

In accordance with one aspect of the present description, and as explained in greater detail below, in response to receiving a request from the system administrator or other user of the system for a log report generated by the system, the system can obtain not only a first log report generated by a first node of the system in which the system administrator may be currently logged into, but can also remotely access other nodes of the system including nodes 120 of the other servers and the controllers 130, 132 and obtain the log reports at those other nodes, in response to the same user request, even though the system administrator is not logged into those nodes.

As another example, in response to receiving a request from the system administrator or other user of the system for a log report generated by the system, the system can remotely access various nodes of the system and obtain the log reports at those nodes in response to that user request, whether or not the system administrator is logged into any of the reporting nodes or has direct access to the reporting nodes. As a result, obtaining pertinent log reports from various nodes of the distributed computing system may be facilitated.

In the illustrated embodiment, the distributed computing system 100 may include, for example, a virtual tape library which appears to applications running on one or more hosts 150 as one automated tape library. Thus, the distributed computing system 100 may include, for example, an automated tape library such as an IBM System Storage TS7680 ProtectTier Deduplication Gateway. It is appreciated that a distributed computing system in accordance with the present description may have other applications, such as storage controllers, for example. Other distributed computing systems may be realized, depending upon the particular application.

An IBM System Storage TS7680 ProtectTier Deduplication Gateway in a typical installation, has a single cluster which includes two physical servers, each physical server having a node. An IBM System Storage TS7680 ProtectTier Deduplication Gateway further typically has two controllers, each controller having a node.

The servers of the TS7680 permit magnetic storage tape processing applications running on the hosts to access virtual robots to move virtual cartridges while the servers actually store data on one or more virtual volumes of a storage fabric represented by one or more disk storage devices 160. The storage fabric includes suitable communication paths 170 between the storage devices 160 of the storage fabric and the servers 110, 112. The storage fabric may include suitable switches and other fabric devices.

The hosts 150 are coupled to the distributed computing system 100 by communication paths 176 of a network fabric. The network fabric may similarly include suitable switches and other fabric communication devices.

In the illustrated embodiment, the controllers 130, 132 provide an interface between the communication paths 176 coupled to the hosts 150, and communication paths 180 of a network fabric coupling the controllers 130, 132 and the servers 110, 112. Thus, the communication paths 176 to the hosts 150 may be based upon a particular host attachment protocol such as FICON, for example, and the communication paths 180 may be based upon the Fibre Channel protocol, for example. It is appreciated that other communication path protocols may be utilized, depending upon the particular application. The network fabric of the communication paths 180 may similarly include suitable switches and other fabric communication devices.

In the illustrated embodiment, the distributed computing system 100 further includes a system console 190 which is typically physically located adjacent one or more of the servers 110, 112 or other components of the distributed computing system 100. The system console 190 may include input and output devices, including a keyboard, mouse and video display, and a KVM (keyboard, video, mouse) switch or other input/output switch, to permit a human operator to directly access a distributed computing system component such as server 110, 112. Thus, suitable busses or other communication paths may be provided among the components of the distributed computing system and the system console 190 to permit a user to provide inputs to and receive outputs from a distributed computing system component such as a server, for example, for local maintenance or operational tasks. It is appreciated that in some applications, a system console may be used to remotely access a distributed computing system component such as a server, for example, for remote maintenance or operational tasks.

The system console 190 may also maintain configuration and other information concerning the components of the distributed computing system 100. For example, the individual network address of each node of the distributed computing system 100 may be monitored and stored by the system console 190.

Figure 2:
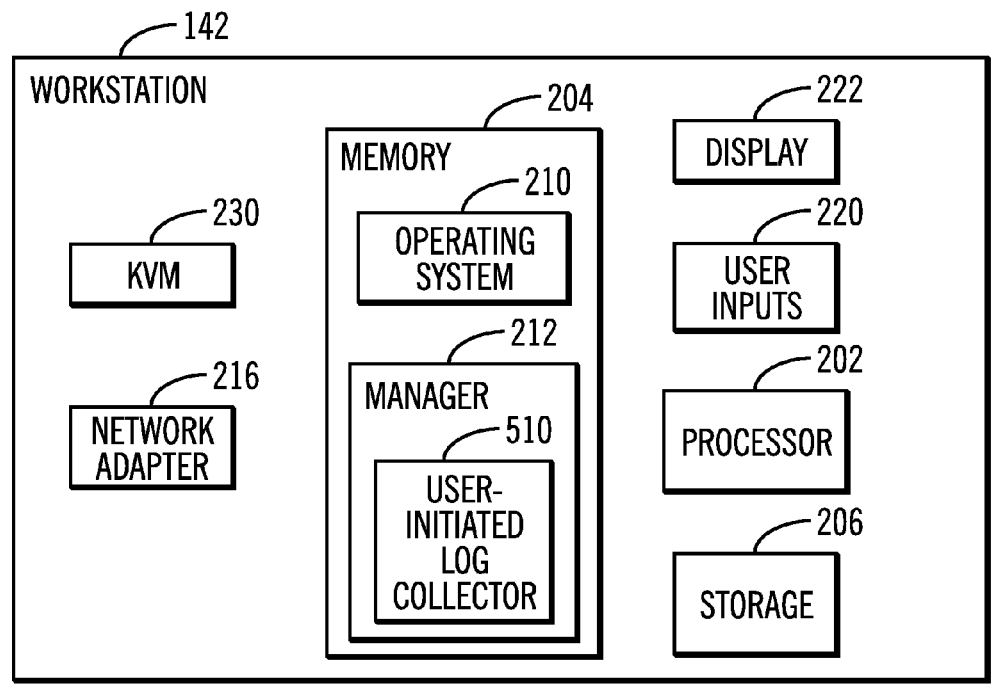
FIG. 2 illustrates an example of a workstation for use in connection with the computing environment of FIG. 1.

FIG. 2 illustrates one embodiment of the workstation 142 which permits a system administrator to remotely monitor selected nodes of the distributed computing system 100. The workstation 142 may comprise any suitable computing device, such as a mainframe, server, personal computer, laptop, handheld computer, telephony device, network appliance, virtualization device, storage controller, etc. The workstation 142 may include a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 as represented by an operating system 210 and a system manager program 212. The workstation 142 further includes a network controller or adapter 216 to enable communication with a network 148, such as an Ethernet, a Fibre Channel Arbitrated Loop, etc. which interconnects the nodes of the distributed computing system 100.

User input devices 220 provide user input to the processor 202, and may include a keyboard, mouse, pen-stylus, microphone, touch sensitive display screen, or any other suitable activation or input mechanism. Output devices 222 are capable of rendering information transmitted from the processor 202, or other component, such as a display monitor, printer, storage, etc. The input devices 220, and output devices 222 may be coupled directly to a node using a suitable KVM (keyboard, video, mouse) switch 230 in some applications.

The system console 190 similarly may comprise any suitable computing device, such as a mainframe, server, personal computer, laptop, handheld computer, telephony device, network appliance, virtualization device, storage controller, etc. Thus, the system console 190 may include a processor, memory, storage, programs, operating system, network controller or adapter, user input devices such as a keyboard, mouse, pen-stylus, microphone, touch sensitive display screen, or any other suitable activation or input mechanism and output devices, such as a display monitor, printer, storage, etc. The input devices, and output devices may be coupled directly to a node using a suitable KVM (keyboard, video, mouse) switch in some applications.

Figures 4A, 4B:
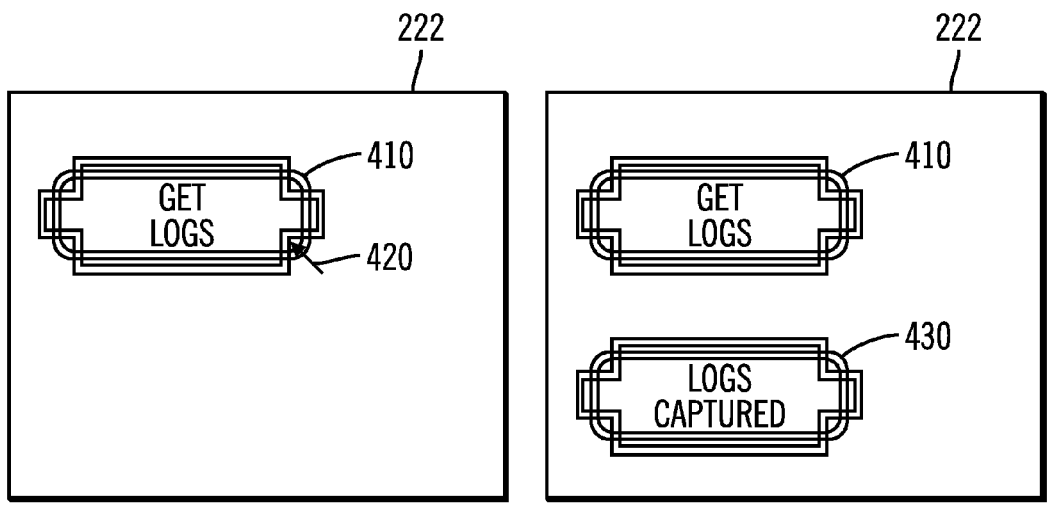
FIGS. 4a and 4b illustrate an example of a graphical user interface for a user-initiated log collector in accordance with one embodiment of the present description.

FIG. 3 depicts one example of operations for user-initiated log collecting in a distributed computing system in accordance with one embodiment of the present description. In a first operation, a request is received (block 310) from a user of a system for a log report generated by the system. For example, FIG. 4a shows a display 222 for the workstation 142, which depicts an icon 410 of a graphical user interface (GUI), which may be selected by a user such as a system administrator 140 (FIG. 5). The icon 410 may have a legend such as "GET LOGS" or "PROBLEM REPORTS" or another suitable legend. Alternatively, or in addition, the icon 410 may include a pictorial representation of a log or other suitable pictorial representation which conveys to the user the function represented by the icon 410. The icon 410 may be selected by the user by "clicking" on or touching the icon using a suitable input device such as a mouse, touch display, keyboard, or camera for example, as represented by the cursor 420.

In response to a request from a user of a system for a log report generated by the system, a first node is accessed (block 320) by a program such as a user-initiated log collector 510 as shown in FIG. 5. The user-initiated log collector 510 may be provided by the system manager program 212, for example, and may be initiated by a user selecting the icon 410, for example. In the illustrated embodiment, the manager program 212 or the user-initiated collector 510 may be run in whole or in part on a programmed processor of the workstation 142 or on a node of the distributed computing system 100, or on another computing device. It is appreciated that a user-initiated log collector in accordance with the description provided herein may be provided as a stand alone program or as a part of a variety of different programs, depending upon the particular application. Furthermore, a user-initiated log collector in accordance with the description provided herein may be provided by dedicated logic circuitry as well as a programmed computing device, or a combination thereof.

In one example, the user 140 operating the manager program 212 may be logged into and monitoring a node 120a of a server 110, 112, when the user 140 notices an event such as a possible malfunction of the system 100 and as a result, requests logs such as problem reports using the icon 410. Alternatively, the user 140 although not logged into any one particular node, may notice an event such as a possible malfunction of the system 100 and, as a result, request logs such as problem reports using the icon 410. Thus, in response to the user selection of the icon 410, the user-initiated collector 510 of the program 212 obtains (block 330) a first log report 520a which may be the log generated by the server node 120a at which the user 140 is currently logged into. Alternatively, as explained in greater detail below, in response to the user selection of the icon 410, the user-initiated collector 510 of the program 212 can remotely access and obtain (block 330) a first log report 520a which may be the log generated by a remote server node 120a at which the user 140 is not currently logged into.

For example, the user-initiated collector 510 of the program 212 may pursuant to a script, automatically issue appropriate logging or other commands to retrieve the problem report or other appropriate log reports from a first node 120a. The first log report 520a retrieved from the node 120a may then be stored in a suitable central log repository 530 or other location readily accessible by the appropriate personnel.

It is appreciated that the log report 520a generated by the first node 120a may have information which is limited in scope to events specific to the first node 120a or may otherwise be incomplete. Thus, it is appreciated that other nodes may potentially generate problem reports or other log information which is pertinent to the user's request.

In accordance with another aspect of the present description, the user-initiated collector 510 also remotely accesses (block 340) a second node, remote from the first node 120a, in addition to the first node 120a, in response to the same user request.

To remotely access a node 120, the network address of that node is typically utilized. In the illustrated embodiment, the system console 190 maintains a record of the network addresses of various nodes of the distributed computing system 100, including the network addresses of the nodes 120 of the controllers 130, 132 which may not be accessible to the system administrator in some applications.

Accordingly, in one embodiment, the user-initiated collector 510 of the program 212 may pursuant to a script, automatically issue appropriate logging or other commands to log into the node 120b of the system console 190 and retrieve or otherwise identify a the network addresses 540 of various nodes of the distributed computing system 100, including the network addresses of the nodes 120 of the servers 110, 112 and the controllers 130, 132. In the illustrated embodiment, the network address of the system console 190 is known to the user-initiated log collector 510. It is appreciated that locations other than a system console may be utilized by a distributed computing system as a repository from which the node network addresses may be obtained. In addition, any pertinent log report 520b of the system console node 120b may be obtained as well.

Using the network addresses fetched from the system console 190, the user-initiated collector 510 of the program 212 may in response to the same user request and pursuant to a script, automatically issue appropriate logging or other commands to log into remote nodes, such as the node 120c of a controller 130, 132, and obtain (block 350) a second or additional log report 520c generated by the node 120c. In a similar manner, using the network addresses fetched from the system console 190, the user-initiated collector 510 of the program 212 may in response to the same user request and pursuant to a script, automatically issue appropriate logging or other commands to log into additional remote nodes, such as the node 120d of a controller 130, 132, and obtain (block 350) a further log report 520d generated by the node 120d. The log reports for all nodes of interest may be obtained in this fashion, using the node network addresses obtained from the system console 190.

It is appreciated that the operations represented in FIG. 3 may be performed in other ordered sets of operations. Thus, for example, using the network addresses fetched from the system console 190, the user-initiated log collector 510 of the program 212 may in response to the user request and pursuant to a script, automatically issue appropriate logging or other commands to log into a remote node, such as the aforementioned node 120a of a server 110, 120, and obtain (block 330) the first log report which was generated by the node 120a. Accordingly, in response to the user request, the user-initiated collector 510 may first log into the system console or other repository of network addresses for remote nodes and, using those network addresses, obtain the log reports from one or more nodes before obtaining log reports from any node for which the user may be already logged into. It is appreciated that in some embodiments, pertinent log reports may be obtained through remote access without the user being logged into any node.

To remotely access a remote node, any suitable network protocol may be utilized for communicating over a network linking the nodes. Such network protocols frequently provide a virtual terminal connection in accordance with the network protocol which permits bidirectional interactive communication including file transfer. Suitable network communication protocols include telnet, FTP (file transfer protocol), secure shell (SSH), PuTTY, Perl, etc.

It is appreciated that various criteria may be utilized for selecting logs or portions of logs for retrieval from nodes of the system 100 in response to a user initiated request. For example, log reports generated within a certain time window of the occurrence of the event or the user-initiated log request may be utilized. Other criteria may be utilized, depending upon the particular application. Alternatively, in some applications, all existing logs may be gathered from the nodes in response to the user request.

Once all the retrieved logs have been stored, an icon 430 (FIG. 4b) may be displayed by the graphical user interface of the user-initiated log collector, to indicate to the system administrator or other log requestor that the logs have been safely retrieved from the various node and stored for ready access. In some embodiments, the log reports may be compressed to reduce storage space occupied by the retrieved logs.

Thus, in one aspect of the present description, it is seen that log reports may be automatically and rapidly gathered from various remote nodes of a distributed computing system in response to as few as a single request of a system administrator. In another aspect of the present description, the scope of the gathered log reports may be suitably limited such as being limited to log reports generated within a certain time window of the occurrence of an event or the user-initiated log request, for example. Still further, log reports may be automatically gathered from various remote nodes, in response to the user's request, including remote nodes that the system administrator may not have access to or may not have the expertise to rapidly access. Other aspects may be utilized, depending upon the particular application.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The variables "a" and "b" when used to represent a variable number of an element may indicate any number of instances of the element, and may indicate different integer numbers when used with different elements or when used with different instances of the same element. For instance variables "a" and "b" used to indicate a number of a source storage and target storage may indicate the same or different number of these elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
   receiving a request from a user of a system for a log report generated by the system;
   accessing a first node of the system in response to the user request;
   obtaining a first log report in response to the same user request, the first log report generated by the first node of the system;
   remotely accessing a second node of the system in response to the same user request, which second node is remote from the first node of the system; and
   obtaining a second log report in response to the same user request, the second log report generated by the second node of the system.

2. The method of claim 1 wherein the receiving the user input includes inputting a selection by the user, of an icon of a graphical user interface of the system, wherein the icon represents a log gathering function of the system.

3. The method of claim 1 wherein the remotely accessing the second node includes communicating over a network linking the first and second nodes, using a virtual terminal connection in accordance with a network protocol which permits bidirectional interactive communication using a virtual terminal connection.

4. The method of claim 1 wherein the remotely accessing the second node includes accessing a system console linked to the first and second nodes by the network and obtaining the network address of the second node from the system console.

5. The method of claim 4 wherein the accessing the system console includes obtaining the network address of the system console from the first node and remotely accessing the system console including communicating over the network linking the first node and the system console using a virtual terminal connection in accordance with a network protocol which permits bidirectional interactive communication using a virtual terminal connection.

6. The method of claim 5 wherein the remotely accessing the second node includes communicating over the network linking the system console and the second node, using a virtual terminal connection in accordance with the network protocol at the network address of the second node obtained from the system console.

7. The method of claim 2 further comprising compressing and storing the first and second log reports of the first and second nodes, respectively, in a common location, and using the graphical user interface, providing a confirmation to the user that the log reports for the first and second nodes have been obtained and stored.

8. A computer program product for managing a distributed computing system having a plurality of nodes, the computer program product comprising a computer readable storage medium having computer readable program code embodied therein that executes to perform operations, the operations comprising:
   receiving a request from a user of a distributed computing system for a log report generated by the distributed computing system;
   accessing a first node of the distributed computing system in response to the user request;
   obtaining a first log report in response to the same user request, the first log report generated by the first node of the distributed computing system;
   remotely accessing a second node of the distributed computing system in response to the same user request, which second node is remote from the first node of the distributed computing system; and
   obtaining a second log report in response to the same user request, the second log report generated by the second node of the distributed computing system.

9. The computer program product of claim 8 wherein the distributed computing system includes a graphical user interface having an icon and wherein the receiving the user input includes inputting a selection by the user, of the icon of the graphical user interface of the distributed computing system, wherein the icon represents a log gathering function of the distributed computing system.

10. The computer program product of claim 8 wherein the distributed computing system includes a network linking the first and second nodes and wherein the remotely accessing the second node includes communicating over the network linking the first and second nodes, using a virtual terminal connection in accordance with a network protocol which permits bidirectional interactive communication using a virtual terminal connection.

11. The computer program product of claim 8 wherein the distributed computing system includes a system console linked to the first and second nodes by the network and wherein the remotely accessing the second node includes accessing the system console linked to the first and second nodes by the network and obtaining the network address of the second node from the system console.

12. The computer program product of claim 11 wherein the accessing the system console includes obtaining the network address of the system console from the first node and remotely accessing the system console including communicating over the network linking the first node and the system console using a virtual terminal connection in accordance with a network protocol which permits bidirectional interactive communication using a virtual terminal connection.

13. The computer program product of claim 12 wherein the remotely accessing the second node includes communicating over the network linking the system console and the second node, using a virtual terminal connection in accordance with the network protocol at the network address of the second node obtained from the system console.

14. The computer program product of claim 9 wherein the operations further comprise compressing and storing the first and second log reports of the first and second nodes, respectively, in a common location, and using the graphical user interface, providing a confirmation to the user that the log reports for the first and second nodes have been obtained and stored.

15. A distributed computing system for use with a network, storage and a host, comprising:
   a plurality of nodes linked by the network, each node including a processor and a computer readable storage medium having computer readable program code embodied therein executed by the processor to perform node operations, the node operations comprising transferring data between the host and the storage, and generating a log report of events concerning the data transferring operations; and
   a systems manager linked by the network to the nodes of the distributed computing system, the system manager including a processor and a computer readable storage medium having computer readable program code embodied therein executed by the processor to perform managing operations, the managing operations comprising:
      receiving a request from a user of the distributed computing system for a log report generated by the distributed computing system;
      accessing a first node of the distributed computing system in response to the user request;
      obtaining a first log report in response to the same user request, the first log report generated by the first node of the distributed computing system;
      remotely accessing a second node of the distributed computing system in response to the same user request, which second node is remote from the first node of the distributed computing system; and
      obtaining a second log report in response to the same user request, the second log report generated by the second node of the distributed computing system.

16. The system of claim 15 wherein the distributed computing system includes a graphical user interface having an icon and wherein the receiving the user input includes inputting a selection by the user, of the icon of the graphical user interface of the distributed computing system, wherein the icon represents a log gathering function of the distributed computing system and wherein the managing operations further comprise compressing and storing the first and second log reports of the first and second nodes, respectively, in a common location, and using the graphical user interface, providing a confirmation to the user that the log reports for the first and second nodes have been obtained and stored.

17. The system of claim 15 wherein the remotely accessing the second node includes communicating over the network linking the first and second nodes, using a virtual terminal connection in accordance with a network protocol which permits bidirectional interactive communication using a virtual terminal connection.

18. The system of claim 15 wherein the distributed computing system includes a system console linked to the first and second nodes by the network and wherein the remotely accessing the second node includes accessing the system console linked to the first and second nodes by the network and obtaining the network address of the second node from the system console.

19. The system of claim 18 wherein the accessing the system console includes obtaining the network address of the system console from the first node and remotely accessing the system console including communicating over the network linking the first node and the system console using a virtual terminal connection in accordance with a network protocol which permits bidirectional interactive communication using a virtual terminal connection.

20. The system of claim 19 wherein the remotely accessing the second node includes communicating over the network linking the system console and the second node, using a virtual terminal connection in accordance with the network protocol at the network address of the second node obtained from the system console.

* * * * *